United States Patent
Camble et al.

(10) Patent No.: US 6,715,031 B2
(45) Date of Patent: Mar. 30, 2004

(54) SYSTEM AND METHOD FOR PARTITIONING A STORAGE AREA NETWORK ASSOCIATED DATA LIBRARY

(75) Inventors: Peter Thomas Camble, Bristol (GB); Stephen Gold, Bristol (GB); Jeffrey Dicorpo, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 200 days.

(21) Appl. No.: 10/034,691

(22) Filed: Dec. 28, 2001

(65) Prior Publication Data

US 2003/0126396 A1 Jul. 3, 2003

(51) Int. Cl.⁷ .......................... G06F 12/00; G06F 13/00
(52) U.S. Cl. ........................ 711/111; 711/112; 711/114; 711/154
(58) Field of Search ................................. 711/100, 112, 711/111, 114, 154, 170; 369/30.06, 30.28, 178.01; 360/98.01; 700/214

(56) References Cited

U.S. PATENT DOCUMENTS

| | | |
|---|---|---|
| 5,164,909 A | 11/1992 | Leonhardt et al. |
| 5,367,669 A * | 11/1994 | Holland et al. ................. 714/7 |
| 5,416,914 A | 5/1995 | Korngiebel et al. |
| 5,734,859 A * | 3/1998 | Yorimitsu et al. .......... 711/112 |
| 5,805,864 A | 9/1998 | Carlson et al. |
| 5,835,940 A * | 11/1998 | Yorimitsu et al. .......... 711/112 |
| 5,867,736 A | 2/1999 | Jantz |
| 5,890,014 A | 3/1999 | Long |
| 5,970,030 A | 10/1999 | Dimitri et al. |
| 6,038,490 A | 3/2000 | Dimitri et al. |
| 6,044,442 A | 3/2000 | Jesionowski |
| 6,085,123 A | 7/2000 | Baca et al. |
| 6,295,578 B1 | 9/2001 | Dimitroff et al. |
| 6,336,172 B1 | 1/2002 | Day, III et al. |
| 6,421,711 B1 | 7/2002 | Blumenau et al. |
| 6,425,059 B1 | 7/2002 | Basham et al. |
| 6,507,896 B2 | 1/2003 | Sanada et al. |
| 6,519,678 B1 | 2/2003 | Basham et al. |
| 6,535,964 B2 | 3/2003 | Sanada et al. |

FOREIGN PATENT DOCUMENTS

| | | |
|---|---|---|
| EP | 0859308 | 7/1998 |
| EP | 1156408 | 11/2001 |
| JP | 09185465 | 7/1997 |
| JP | 10269026 | 10/1998 |
| JP | 2001014257 | 1/2001 |

OTHER PUBLICATIONS

Foreign Search Report dated Feb. 13, 2003.
IBM Technical Disclosure Bulletin, "Optical Disk Drive Loader for Work Station with Pluggable Magazine", vol. 38, No. 12, Dec. 1955, pp. 243–246.
IBM Technical Disclosure Bulletin, "Logical Grouping of Data Storage Media in a Library System", vol. 35, No. 5, Oct. 1992—pp. 17–20.
"Sharing Backup Resources," Ralph Cuellar; Apr. 2000.
"The Gator Tape Library Family Architecture," John Kranz; Oct. 1999.
"Fibre Channel Fundamentals," Tom Weimer.
"Spectra 12000 User Guide," Sep. 2000.

* cited by examiner

Primary Examiner—Tuan V. Thai

(57) ABSTRACT

A storage area network associated data library partitioning system comprises a plurality of storage element slots adapted to store data storage media, at least one set of at least one of the slots is assigned to one partition of a plurality of partitions, a plurality of data transfer elements that are adapted to receive the media and transfer data to and from the media, each of at least one set of at least one of the data transfer elements is assigned to one of the partitions, and a library controller that assigns a different logical element designation to a virtual controller for each of the partitions, the virtual controllers directing movement of the media to and from one of the set of slots assigned to a same of the partitions.

52 Claims, 8 Drawing Sheets

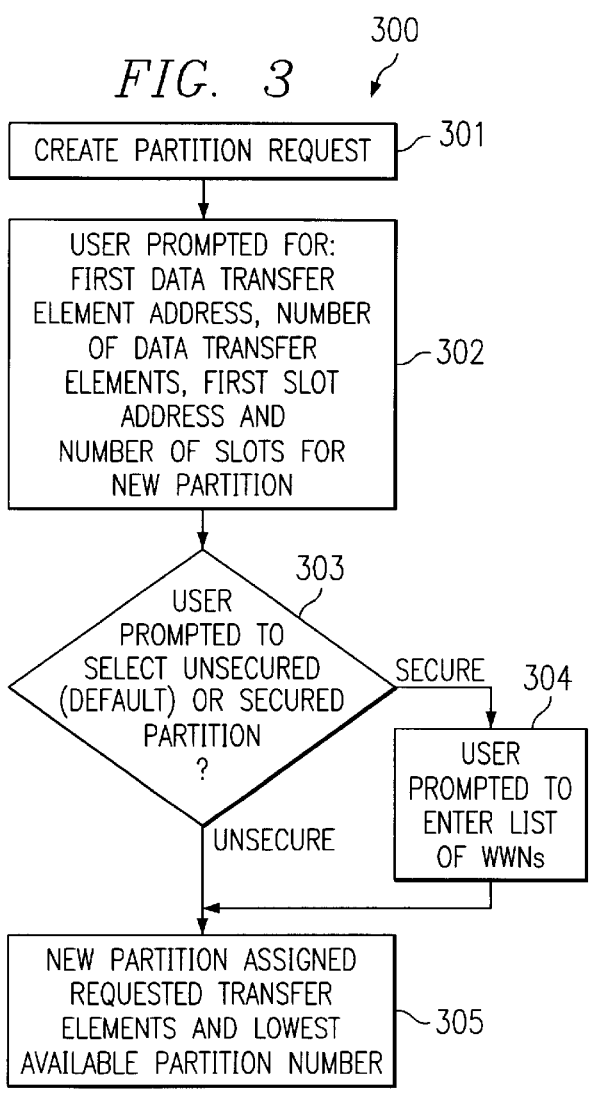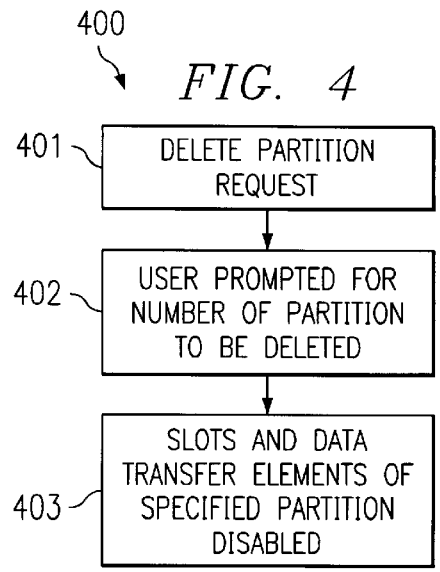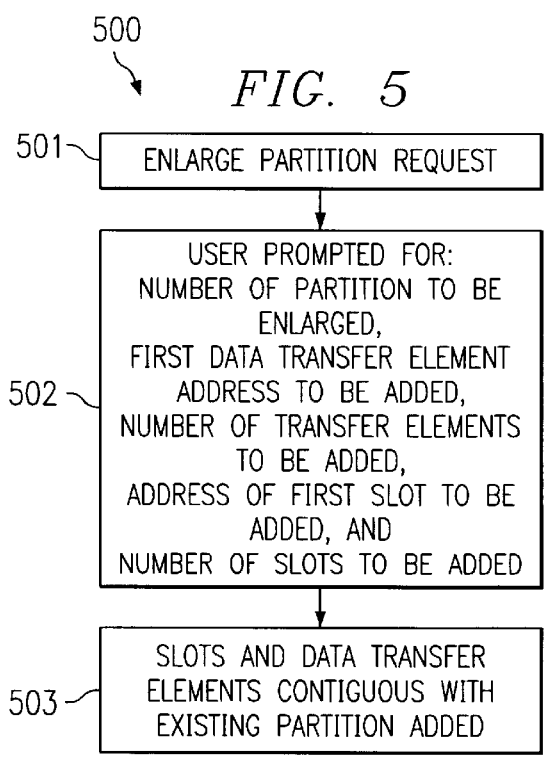

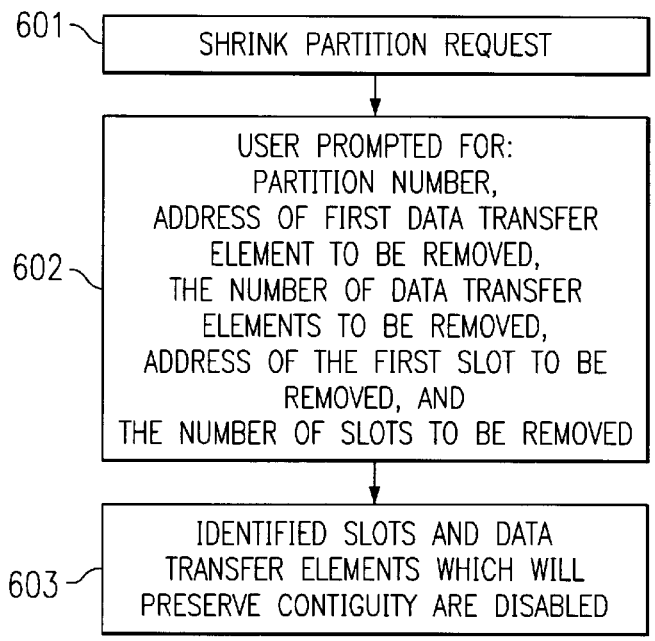
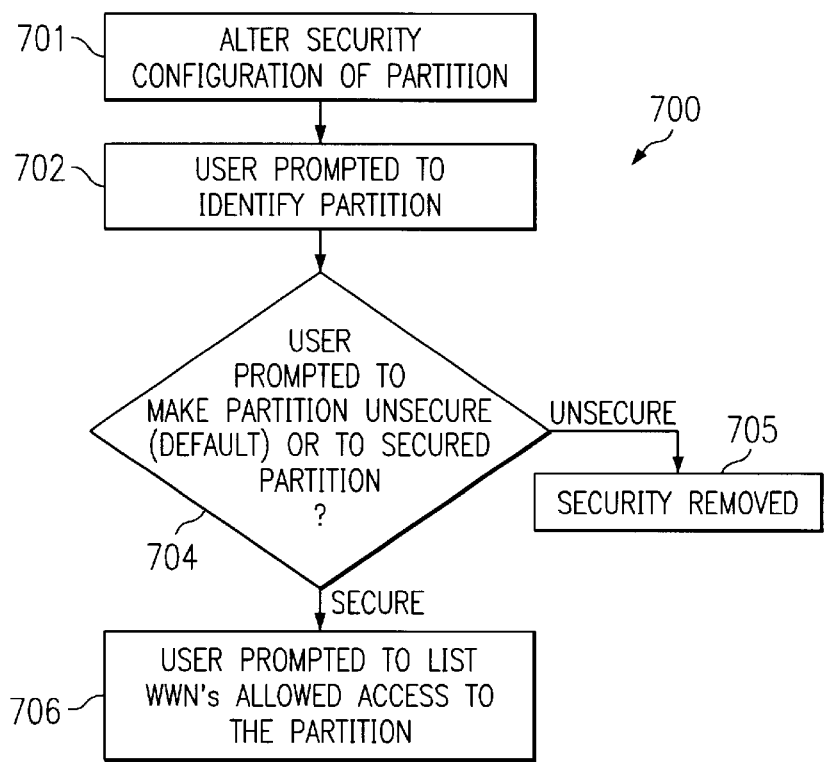

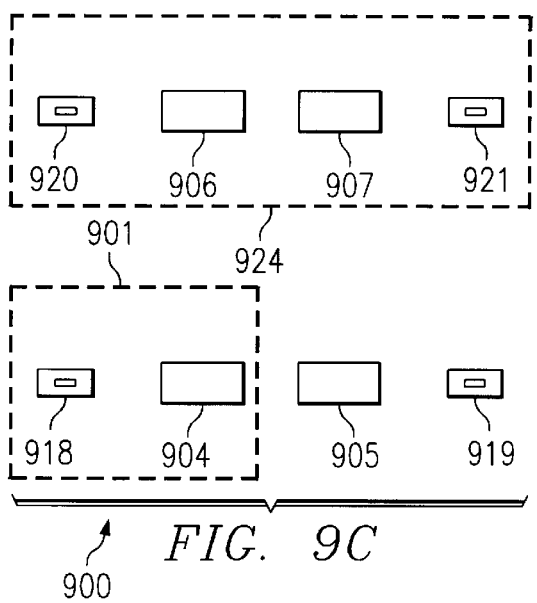
FIG. 9C
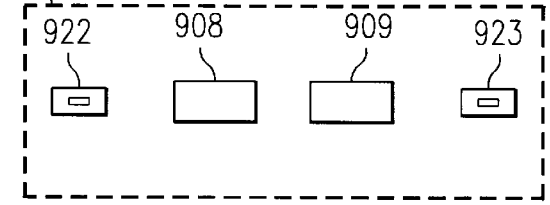
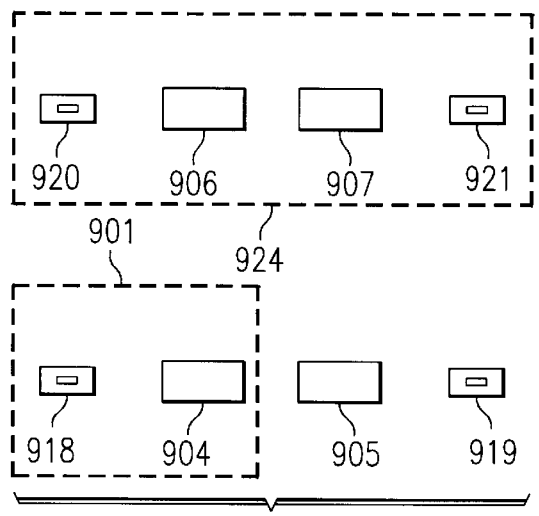
FIG. 9D

SYSTEM AND METHOD FOR PARTITIONING A STORAGE AREA NETWORK ASSOCIATED DATA LIBRARY

RELATED APPLICATIONS

The present invention is related to the following copending and commonly assigned U.S patent application Ser. No. 10/033,009 entitled System and Method for Partitioning a Storage Area Network Associated Data Library Employing Element Addresses, filed Dec. 28, 2001, now pending; Ser. No. 10/032,662 entitled System and Method for Managing Access To Multiple Devices in a Partitioned Data Library, filed Dec. 28, 2001, now pending; Ser. No. 10/032,923 entitled System and Method for Peripheral Device Virtual Functionality Overlay, filed Dec. 28, 2001, now pending; Ser. No. 10/034,518 entitled System and Method for Securing Drive Access to Media Based On Medium Identification Numbers, filed Dec. 28, 2001, now pending; Ser. No. 10/034,588 entitled System and Method for Securing Drive Access to Data Storage Media Based On Medium Identifiers, filed Dec. 28, 2001, now pending; Ser. No. 10/033,010 entitled System and Method for Securing Fiber Channel Drive Access in a Partitioned Data Library, filed Dec. 28, 2001, now pending; Ser. No. 10/033,003 entitled Method for Using Partitioning to Provide Capacity on Demand in Data Libraries, filed Dec. 28, 2001, now pending; Ser. No. 10/034,580 entitled System and Method for Intermediating Communication with a Moveable Media Library Utilizing a Plurality of Partitions, filed Dec. 28, 2001, now allowed; and Ser. No. 10/034,083, entitled System and Method for Managing a Moveable Media Library with Library Partitions, filed Dec. 28, 2001, now pending; the disclosures of which are hereby incorporated herein by reference.

TECHNICAL FIELD

The present invention is generally related to data storage and specifically to a system and method for partitioning a storage area network associated data library.

BACKGROUND

One of the most attractive aspects of a storage area network (SAN) is that network connectivity enables a company to efficiently use storage by sharing storage capacity among a number of servers. This may be implemented using a large number of small capacity storage devices. However, unless sufficiently robust management software is employed, such use of small capacity devices in a SAN may result in significant management overhead.

Most users prefer to install large capacity storage device(s) and partition the device(s), assigning each partition to a different server. For example, existing firmware for enterprise level disk arrays allow users to define multiple redundant array of independent disks (RAID) sets, where each RAID set appears as a different logical unit number (LUN). Each one of these LUNs may be dedicated to a different server. However, to-date special hardware, as described below, or special backup software has been used to implement partitioning.

An existing hardware-based partitioning scheme for existing libraries is known as shared library services. This implementation requires at least one bridge, sometimes referred to as a quad interface processor, to be placed between the drives and the library controller. The host side of each quad interface processor consists of two small computer systems interface (SCSI) buses, and the quad interface processor may show a single virtual library controller, with its own SCSI ID, on each SCSI bus. Thus there may be one virtual library per host SCSI bus, containing the virtual library controller and the drives in that partition. Each partition of such an existing library may have slots added in increments and drives may be added individually or in pairs. Each internal SCSI bus in this existing partitioning scheme may accommodate up to two drives; drives on the same bus must be in the same partition.

Such an existing hardware-based library partitioning scheme may use switches to provide secure partitioning. Existing quad interface processor bridges employ a SCSI target ID for each partition. Each SCSI ID may have a separate SCSI/fiber channel (FC) bridge associated with it. Other existing libraries do not provide secure partitioning.

Existing software-based partitioning solutions typically employ a host system that restricts access to portions of a tape library. The host restrictions are implemented by a mediating (software) process on a host system to enforce partition restrictions. However, this approach is problematic. Specifically, the approach is undesirable if the tape library is utilized in a storage service provider (SSP) environment. In SSP environments, the tape library and the host systems belong to different entities (e.g., the SSP and the customers). Placement of software mediating processes on host systems is unattractive, because it increases the burden on the customers to make use of the storage service. Also, corporate environments impose relatively long qualification cycles for new host system software. New software is typically only introduced in such environments once every six to eight months due to qualification cycles. Moreover, many customers are unwilling to allow other parties to place software on their host systems. Additionally, the software mediating process approach is typically incompatible with existing data back-up utilities, i.e., the software mediating process approach requires the use of specialized data back-up applications. Hence, users are effectively denied the ability to run desired backup software.

SUMMARY OF THE INVENTION

A storage area network associated data library partitioning system comprises a plurality of storage element slots adapted to store data storage media, at least one set of at least one of the slots is assigned to one partition of a plurality of partitions, a plurality of data transfer elements that are adapted to receive the media and transfer data to and from the media, each of at least one set of at least one of the data transfer elements is assigned to one of the partitions, and a library controller that assigns a different logical element designation to a virtual controller for each of the partitions, the virtual controllers directing movement of the media to and from one of the set of slots assigned to a same of the partitions.

A method in accordance with the present invention for partitioning a storage area network associated data library comprises assigning a different logical element designation to each of a plurality of library partitions, establishing the partitions in the data library, each of the partitions comprising at least one storage element slot and at least one data transfer element, each of the slots adapted to store media, and each of the data transfer elements adapted to receive the media and transfer data to and from the media, and controlling movement of the media to and from the slots assigned to a same partition.

BRIEF DESCRIPTION OF THE DRAWINGS

FIG. 3 is a flow chart of creation of a partition in accordance with the inventive partitioning method of the present invention;

FIG. 4 is a flow chart of deletion of a partition in accordance with the inventive partitioning method of the present invention;

FIG. 5 is a flow chart of enlargement of a partition in accordance with the inventive partitioning method of the present invention;

FIG. 6 is a flow chart of reduction of a partition in accordance with the inventive partitioning method of the present invention;

FIG. 7 is a flow chart showing an alteration of the security configuration of a partition in accordance with the inventive partitioning method of the present invention;

FIGS. 9A through 9D are diagrammatic illustrations of an exemplary, data tape library partitioned by the present system, under a compatibility embodiment with the partitions being redefined between FIGS. 9A through 9D.

DETAILED DESCRIPTION

The present data library partitioning system and method for storage area networks enables a data library to be shared among a number of servers and/or RAID partitions by partitioning the library. Under the present system and method a subset of the library drives and media slots are secured or reserved for the exclusive use of a specific server. The presence of, as well as access to, a partition may also be secured. A library partition in accordance with the present invention may identify itself and present identical resources, such as drive(s), storage element(s) and/or transport(s), as an existing tape library model so that existing software may recognize the library type.

The present system and method eliminates the need for special bridges such as the aforementioned quad interface processors. Thereby, the present system and method also eliminates the need to have all drives in a partition on a same SCSI bus to a host, thereby avoiding resulting potential bottlenecks. Instead standard existing library architectures may be used by the present invention, with drives allowed to employ existing SCSI buses. In order to implement multiple virtual controllers with each virtual controller assigned to a separate partition, the controller preferably assigns a different SCSI LUN or similar logical element designation, preferably under the controller's SCSI ID, to a virtual controller for each partition. Partitions may be secured in a FC-SAN environment by only allowing access to specified hosts, keyed on unique host device identifiers such as world wide names (WWN), without requiring external switches to implement switch zoning to secure partitions. Integrated configuration of all major components involved in secure partitioning, including but not limited to bridges, library controller and drives, by the present library management system and method provide a simple point-and-click setup process. This greatly reduces management overhead and margin for error compared to existing libraries employing multiple bridges and FC switch zoning, where each component has to be separately set up.

The present SAN partitioning system and method is preferably adapted for use with an internet small computer systems interface (iSCSI) associated library as well an FC attached library or SCSI-based library. Unique host device identifiers for security in an iSCSI environment may be iSCSI names or other unique identifiers such as Ethernet addresses.

Figure 1:
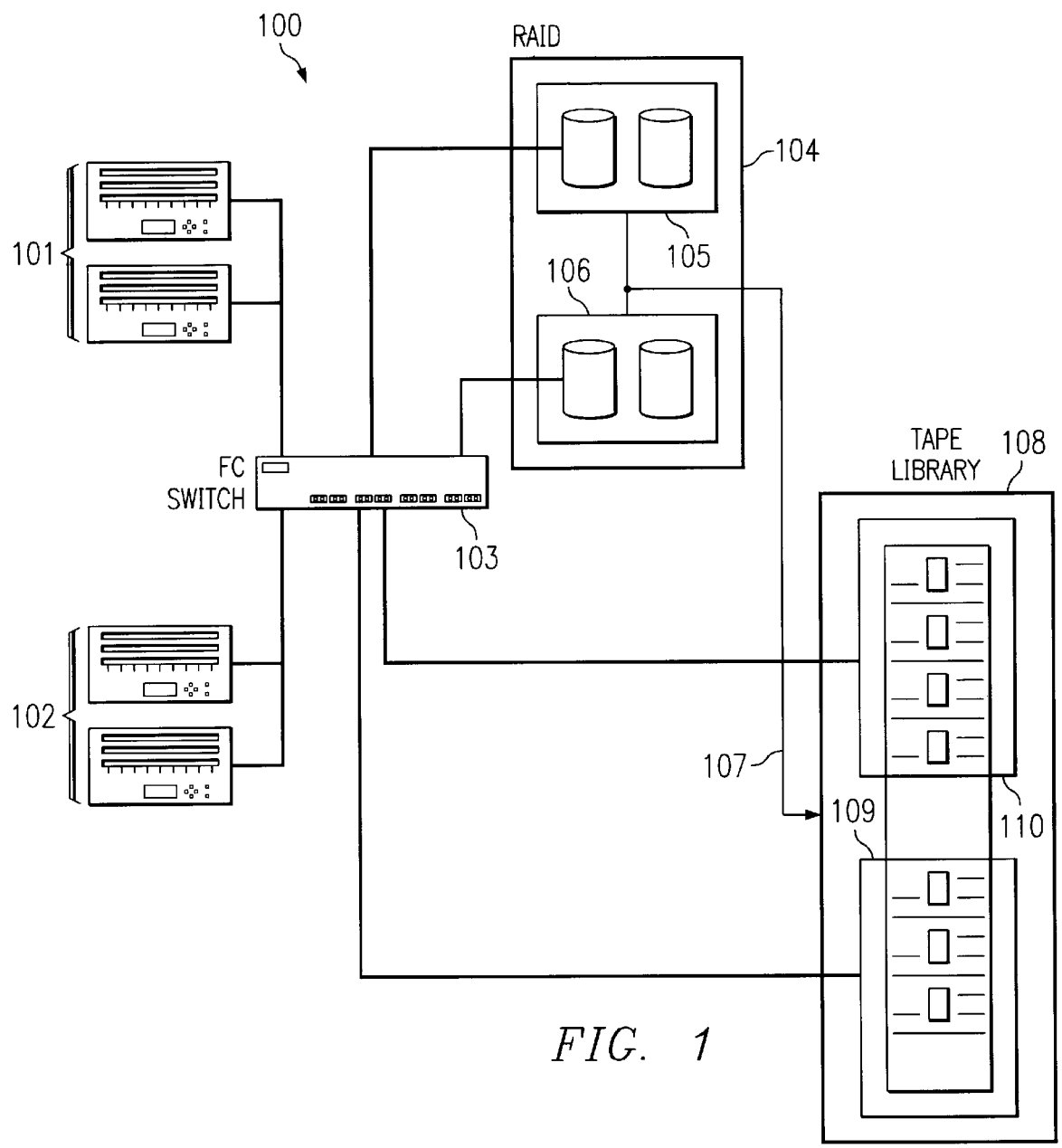
FIG. 1 is a diagrammatic illustration of a SAN operating consistent with the teachings of the present invention.

Turning to FIG. 1, SAN 100 is shown. By way of example, first and second customer servers 101 and 102 are connected to SAN 100 via FC switch 103. RAID 104 may be partitioned assigning first partition 105 to server 101 and second partition 106 to server 102 using existing LUN-based RAID partitioning methods. Zero downtime backups (ZDBs) may be performed of the data each server has on the RAID to tape library 108, via ZDB interconnectivity 107 between RAID 104 and tape library 108. Such ZDBs may employ data-mover firmware embodied in RAID 104 or other SAN elements. ZDBs are preferably carried out without impinging on processor operations or local area network (LAN) capacity of servers 101 and 102. Tape library 108 is preferably partitioned employing an embodiment of the present system and method to ensure that data for server 101 is maintained in partition 109 separate from data for server 102, and that the data of server 102 is maintained in partition 110 separate from data for server 101. Such partitioning ensures that the servers may not access each other's data even though both servers' data is maintained in the same physical library.

Figure 2:
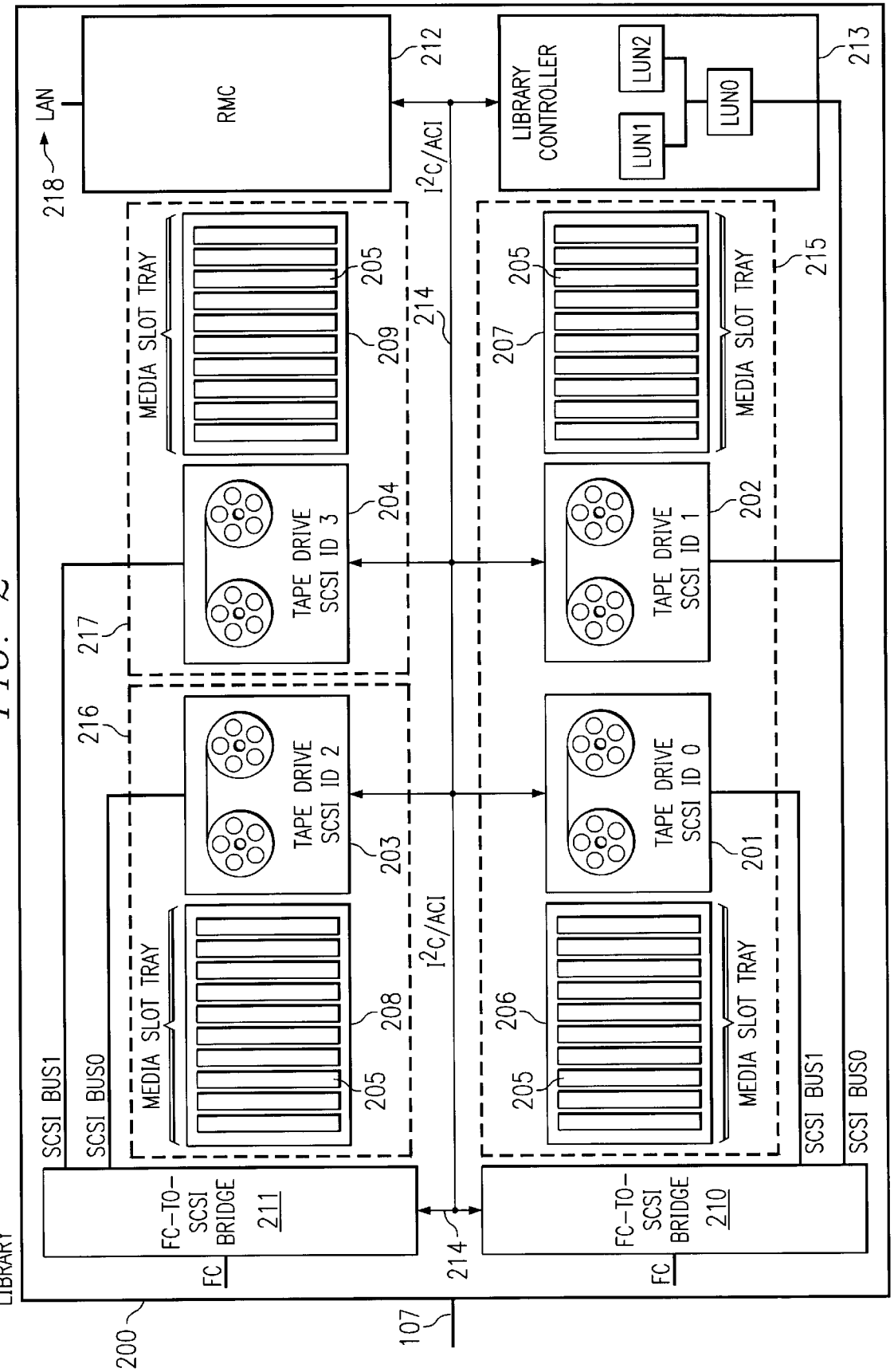
FIG. 2 is a diagrammatic illustration of an example of a data library employing an embodiment of the data library partitioning system and method of the present system.

Data tape library 200 employing a preferred embodiment of the present system and method is illustrated in FIG. 2 as an example of a library that may be employed as library 108 of FIG. 1. However, other library designs and/or capacities may embody the present system and method. Exemplar data tape library 200 has four data transfer elements in the form of tape drives 201–204, forty media storage element slots 205 that are shown organized into four trays 206–209 of ten slots 205 each, two FC-to-SCSI bridges 210 and 211, a library management interface card or remote management card (RMC) 212 and library controller 213. Tape drives 201–204, FC-to-SCSI bridges 210 and 211, RMC 212 and library controller 213 preferably communicate with each other using an inter-integrated circuit ($I^2C$) serial management bus and/or automated control interface (ACI) 214 or the like. Any of tape drives 201–204 may be SCSI based devices or FC tape drives that may employ cartridge memory (CM) reading functionality.

For partitions according to the present system and method, library media slots 205 and tape-drives 201–204 should be assigned to each partition, and a virtual library controller should be addressable with respect to each partition. The slots may be assigned by trays or individually. The example partitioning shown in FIG. 2 is indicated by boxes 215, 216 and 217. As illustrated, LUN0 corresponds to partition 215, LUN1 corresponds to partition 216 and LUN2 corresponds to partition 217. Finally, import/export elements or mailslots may be assigned to each partition or configured for use by the entire library. Preferably, easily-accessible media storage slots may be configured as mailslots by the present invention.

In the present library partitioning implementation, library partitioning is preferably configured out-of-band either on the library's front panel management interface or via secure RMC 212 over associated LAN 218 or the like. This helps ensure controlled access security of the partitioning process by, for example, limiting access to users with access to LAN 218 or physical access to the front panel of library 200. Alternatively, the present partitioning system and method may be configured over a secured in-band connection. Over out-of-band LAN 218, configuration may either be carried out via a web browser interface or via a network management protocol interface. By default, data library 200 will preferably contain one unsecured partition preferably labeled as partition 0 that contains a standard configuration of library data transfer elements (drives) 201–204, library storage elements (slots) 205 including import/export elements (mailslots), and data movers associated with library 200.

For the present partitioning system and method to be transparent to a user server, the library robotic arm used to move media from slots to drives may be shared among user servers. However, it should appear to each server that it is the owner of the arm. Mailslots are also shared resources that need to be virtualized or replicated by the partitioning system. Therefore, import/export elements should either be assigned to partitions similar to the storage elements or ownership of the import/export elements should be virtualized.

Each created partition preferably has one mailslot initially, except as discussed below when emulating a library without a mailslot. Preferably, the mailslot configuration of the partition may be altered once the partition is created, using the standard mechanisms/interfaces provided by the tape library. However, mailslots should be configured on a per-partition basis. If a tape drive or mailslot in a partition is loaded with a tape, a request to alter the configuration of the partition associated with the tape, tape drive and/or mailslot should be denied until the mailslot is cleared.

Most libraries have a single library controller addressed via a single SCSI ID. To eliminate the need to have a number of cooperating controllers as in existing partitioning systems, the SCSI LUN scheme defined in the SCSI standard is preferably used by the present system and method to enable controller 213 to present multiple instances of itself. Preferably, controller 213 partitions the storage slots and import/exports slots as requested via RMC 212. For example, a first instance of the library controller may be presented on LUN0 for partition 215; a second instance might be presented on LUN1 for partition 216; and a third instance on LUN2 for partition 217. Although only one physical controller 213 is needed on the SCSI bus, the controller firmware may be called upon to deal with a command active on each individual LUN (i.e., properly support disconnects), and correctly maintain the current active state for each LUN (e.g., response to test unit ready and request sense, mode pages, log pages, etc).

Preferably, library partitioning is configured out-of band, for example over LAN 218 through RMC 212, via a secure web browser interface or the like. Preferably, LAN 218 is an Ethernet network or the like dedicated to management of SAN resources. Alternatively, configuration of partitions may be programmatically carried out via a network management protocol. Preferably, RMC 212 communicates with library controller 213, FC-to-SCSI bridges 210, 211 and/or tape drives 201–204 to communicate configuration information to implement the selected partitioning. Preferably, RMC 212 will also show diagrammatically, via a web browser interface, or schematically, via a network management protocol interface, how library 200 is partitioned.

By way of example, firmware of FC-to-SCSI bridges 210 and 211 should only allow commands from valid hosts, which may be based on a unique host identifier such as WWN, to be passed to controller 213 and drives in library 200. In addition, bridges 210 and 211 should only show components, tape drives 201–204 and a library controller instance that are members of the partition or partitions the host has been allowed to access. An appropriate LUN mapping scheme should be used to avoid gaps in the LUN numbering shown behind the bridge FC arbitrated loop physical address (ALPA). Finally, any data-movers associated with the bridge should be subject to per-host security preventing data exchange via data-mover system 107 or the like to an inappropriate host. Data mover security may also be based upon a unique host identifier such as WWN.

RMC 212 will preferably process requests received out of band via the web browser interface or network management protocol interface to alter configuration of a specified partition, one at a time. The authority of a requester is ensured by controlled access security incorporated into the present system and method. For example, LAN 218 is preferably dedicated to managing SAN resources and is preferably not available to outside users; the web browser user interface preferably requires a secure log-on; and the network management protocol interface is also preferably protected by similar password authentication. Preferably, at least four different types of requests may be processed, as illustrated in FIGS. 3–6.

Turning to FIG. 3, create partition request 300 initiated at box 301 preferably contains, or the user is prompted to provide, the first data transfer element address and the number of data transfer elements for the new partition, as well as the first slot address and the number of slots for the new partition, box 302. As part of create partition process 300, the user is provided a default choice of making the partition unsecured or given the option of securing the partition at 303. If the user chooses to secure the partition at box 304, the user enters a list of a unique host identifiers, such as WWNs, for hosts allowed to access the partition. At box 305 the new partition should be assigned the lowest partition number available and slot and transfer elements requested at box 302. All elements for a new partition should be disabled prior to selection and selected elements should conform to configuration rules for the overall partitioning scheme the library is operating under by being contiguous.

Delete partition request 400 is depicted in FIG. 4. Preferably initiation of a delete partition request at box 401 contains the number of the partition or the user is prompted to provide the partition number at box 402. As a result of the delete command, all elements in the partition will preferably be disabled at box 403.

Enlarge partition request 500, as shown in FIG. 5, preferably identifies the partition being enlarged, contains the first data transfer element address to be added, indicates the number of data transfer elements to be added, identifies the first slot address to be added and specifies the number of slots to be added. This information may be provided when the user initiates enlarge request 500 at box 501 or the user may be prompted to provide the information at box 502. The elements added at box 503 should be disabled prior to selection and selection of elements should conform to the configuration rules of the partitioning scheme the library is operating under by being contiguous with existing elements of the partition.

In FIG. 6, shrink partition request 600 preferably identifies, at box 601, or prompts the user to provide at box 602, the partition being reduced. Request 601 or prompt 602 preferably includes first data transfer element address to be removed, enumerates the number of data transfer elements to be removed, indicates the first slot address of the slots to be removed and specifies the number of slots to be removed.

The elements selected for removal at box 603 should conform to the configuration rules of the partitioning scheme the library is operating under by being contiguous with each other and the existing partition. Enlarge and shrink partition requests 500 and 600, respectively, may only be valid for a flexibility-oriented partition embodiment as discussed in greater detail below.

Turning to FIG. 7, if the user subsequently selects to alter the security configuration of a partition, process 700 is employed. Upon evoking a security alteration request at box 701, the user may be presented with a default choice of making the partition unsecured at 704. The default choice at 704 is preferably unsecured. Selection of unsecured at 704 results in security for the partition being set to unsecured at box 705. If the user chooses to secure the partition at 704, then the user is prompted to enter a list of WWNs or other applicable unique host device identifiers to be allowed access to the identified partition at box 706.

The RMC is preferably responsible for maintaining overall coordination regarding how the library partitioning is configured. Accordingly, the RMC of the preferred embodiment communicates with the library controller to direct configuration of the library controller to implement the selected partitioning. The RMC may also communicate with any FC-to-SCSI bridges and FC tape drives in the library to configure security. The RMC will preferably show diagrammatically via its web browser interface, on the library front panel or schematically via a network management protocol interface, how its library is partitioned. Preferably, a user may configure the partitioning by selection of elements on the diagram and selecting a type of request, such as create partition 300, delete partition 400, enlarge partition 500, shrink partition 600, or change security configuration of partition 700.

If an FC-to-SCSI bridge supports data-mover LUNs then, according to a preferred embodiment, the data-mover FC LUNs may also be added/removed to and from partitions and viewed as part of the partition configuration via the RMC. The security applied to a data-mover LUN will preferably be the security applied to the partition of which it is a member. Thus, WWN-based security may be employed to control access to data movers in the present system and method. Removal of a data mover from a partition results in the data-mover being disabled, which means it will not accept requests from any host. If these data-movers are embodied in (a) FC-to-SCSI bridge(s), the data-mover LUNs may not be listed as elements by the library controller as such data movers may only exist in the FC-to-SCSI bridge. Data-mover functionality may also be incorporated into existing FC tape drives that are a part of the data library.

Preferably, library partitioning will be persistent between power-cycles and will not require a power cycle for partitioning alterations to take effect. Preferably, the RMC will detect a firmware update to the library controller, and accordingly reconfigure the partitioning in the library controller.

Media movement options, such as maintenance or inventory-related media movement, available on the RMC web browser page or front panel preferably limits media movement to within partitions. In other words, media will preferably only be moved between tape drives, storage slots and mailslots within the same partition. This may also include the use of cleaning cartridges. This limitation may be implemented by requiring the user to select a partition first before selecting the type of operation, and the operation should limit choices to drives and slots in that partition. Library diagnostics should ensure, that during diagnosis, media is never moved out of assigned partitions and that media is maintained in the slots or drives of its assigned partition. Inventory checking and/or door locking and unlocking functions may preferably be allowed through at least one selected partition for the entire library and for partitions on a per partition basis.

By default the library preferably contains one partition, the entire library, with no security applied to facilitate setup of partitions as necessary. Preferably, a user may alter partitioning using one of a number of embodiments. Two such embodiments are presented below. A library will preferably be configured to only use one partition embodiment at a time. To change the partition embodiment used, all partitions should be deleted, resulting in all elements being disabled. Of possible partitioning embodiments, one is optimized for flexibility and another for compatibility with existing backup software.

FIGS. 8A–8D show examples of valid assignments of drive(s) and slots, by trays, during stages of reconfiguration of partitioning, consistent with valid partitioning under a flexibility embodiment 800. Preferably, a flexibility-oriented embodiment 800 allows partitions 801, 802 and 803 in the library to contain multiples of slots or a number of trays 804 through 817, each made up of a number of slots. All of the slots selected are preferably in a contiguous sequence of storage element numbers to facilitate slot renumbering under a specific LUN. Preferably, in each partition any import/export elements are made up of the highest numbered storage elements in the partition. Preferably, at least one drive 818 through 823 is included in a partition, allowing a partition to operate independent of other partitions. Drives 818 through 823 in partitions 801 through 803 are preferably in a contiguous sequence of data transfer element numbers. A library controller inquiry string for each active partition under the flexibility embodiment is preferably unique. The inquiry string is preferably based on the number of slots and drives in the partition, similar to inquiry strings for existing libraries.

Generally, all actions that may be performed on partitions under the present system and method may be performed on partitions 801–803 under the flexibility-oriented embodiment. As discussed earlier in reference to FIG. 4, delete partition request results in slots, or trays, and data transfer elements in the partition being disabled. Thereby, the slots and data transfer elements should be designated as not belonging to any secured or unsecured partition. A create partition request as discussed in reference to FIG. 3 may be carried out using selected, previously disabled, slots and data transfer elements. A remove or shrink request of FIG. 6 is preferably permitted for selected slots, in blocks of slots or a tray at a time and by data transfer elements from a partition. The selected tray of slots is preferably either at the start or the end of the list of slots in the partition to ensure that the partition is comprised of contiguous slots. Similarly, data transfer elements to be removed preferably are either at the end or the start of the list of data transfer elements in the partition to ensure that the partition is comprised of contiguously numbered data transfer elements. These slots or trays and data transfer elements should then be disabled, not belonging to any secured or unsecured partition. Add requests, consistent with the enlarge request of FIG. 5, deal in selected disabled blocks of slots or individual trays and data transfer elements for a partition. Selected additional trays of slots are preferably either at the start or the end of the list of slots in that partition to ensure that the partition is comprised of contiguous slots. Similarly, data transfer elements added are preferably either at the end or the start of the list of data transfer elements in the partition to ensure that the partition is comprised of contiguously numbered data transfer elements. Therefore, moving slots or data transfer elements from one partition to another may be accomplished in a two-stage process. First the slots and/or data transfer elements are removed from a partition disabling the slots and/or data transfer elements. Then the slots and/or data transfer elements are added to the second partition.

Figure 8A:
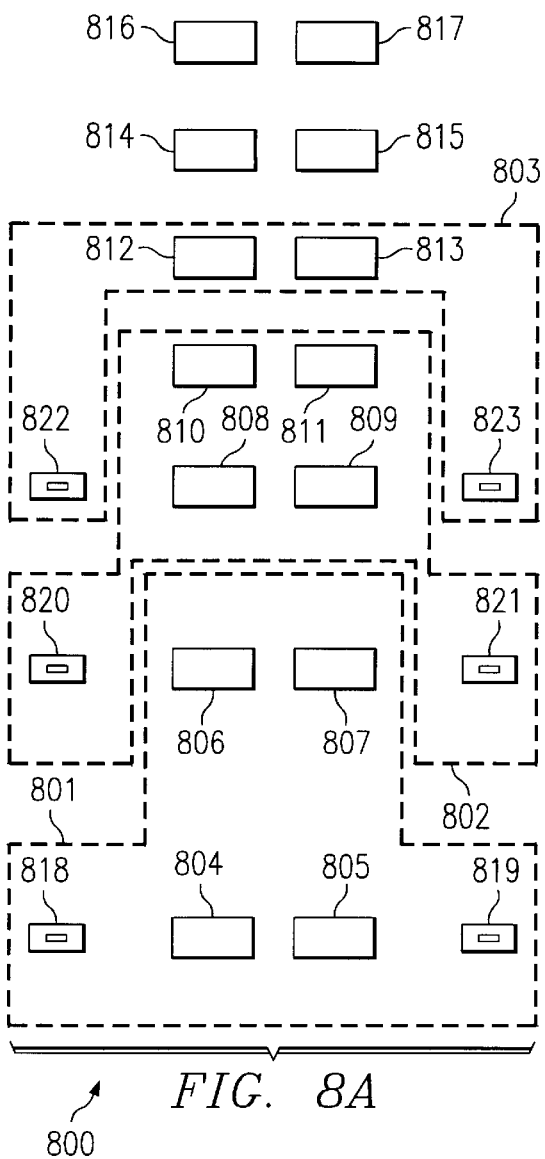
FIGS. 8A through 8D are diagrammatic illustrations of an exemplary, data tape library partitioned consistent with the teachings of the present invention by the present system, under a flexibility embodiment with the partitions being redefined between FIGS. 8A through 8D.
Figure 8B:
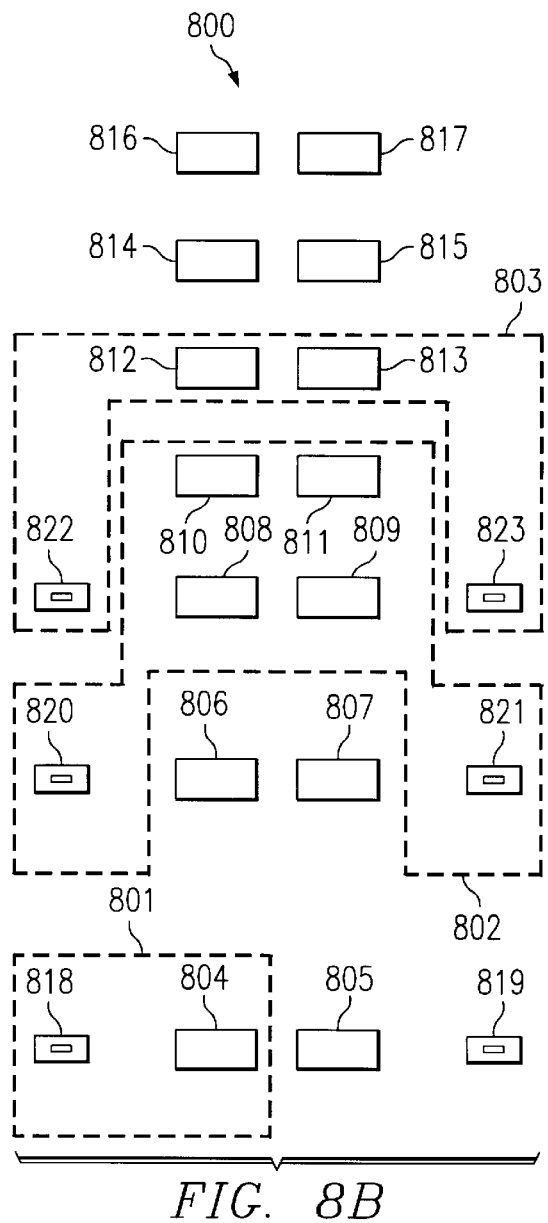

In FIG. 8A a six drive, fourteen tray library employing flexibility embodiment 800 is divided into partitions 801, 802 and 803. First partition 801 has two drives 818 and 819 and four trays 804 through 807, for forty slots. Second partition 802 has two drives 820 and 821 and four trays 808 through 811, for forty slots. Third partition 803 has two drives 822 and 823 and two trays 812 and 813, for twenty slots. Trays 814 through 817 are disabled and unassigned in FIG. 8A A set of thirty slots, trays 805, 806 and 807 and drive 819 have been disabled between FIGS. 8A and 8B. This is preferably carried out using a remove request designating partition 801 and the slots of trays 805 through 807 and drive 819.

Figure 8C:
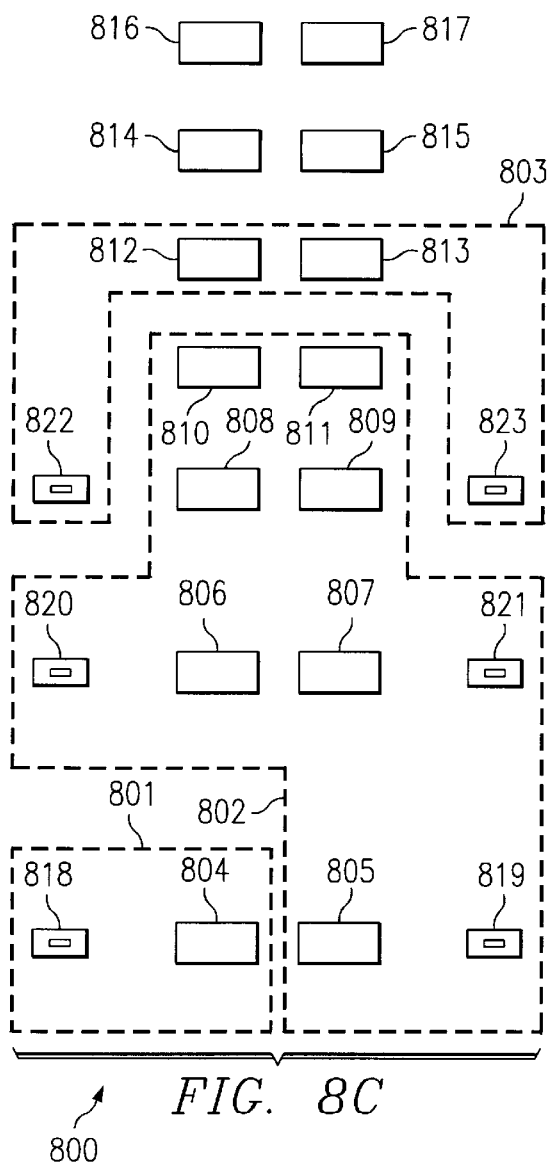

In FIG. 8C, the disabled drive 819 and slots of trays 805 through 807 are added to partition 802 using an add request designating the slots of trays 805 through 807 and drive 819. This addition is permitted, according to a preferred embodiment, as the slots are disabled and are contiguous with existing partition 802 slots of tray 808. Similarly, drive 819 was disabled and contiguous with drive 820 of partition 802.

Figure 8D:
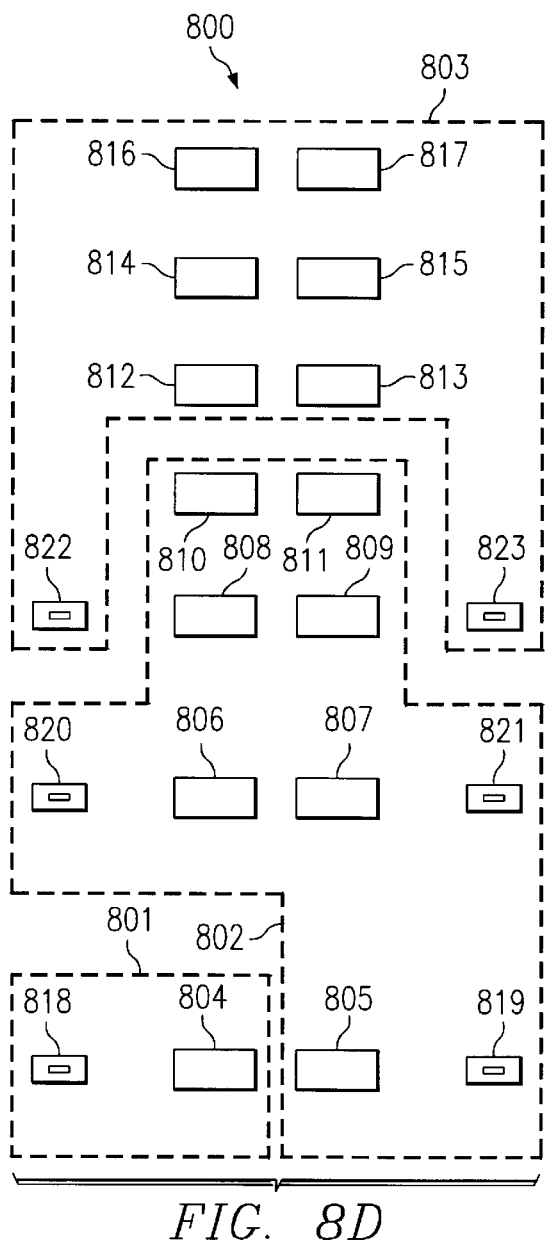

In FIG. 8D, the previously unassigned and therefore disabled slots of trays 814 through 817 are added to partition 803 using an add request. The slots of trays 814 through 817 are contiguous with existing slots of tray 813 of partition 803. Therefore, this addition is also permissible according to a preferred embodiment.

A flexibility-oriented partition may be configured using methods provided by the library to have a number of import/export elements. Generally, a partition may have zero, one, five or ten import/export elements. The import/export elements will preferably be comprised of the highest numbered slots of the last tray in a partition and will preferably be reassigned as appropriate as a partition is resized. Therefore, in FIGS. 8A through 8D, the mailslot(s) assigned for partition 801 is preferably the highest number slot(s) of tray 807 in FIG. 8A. Then the highest number slot(s) of tray 804 is reassigned as mailslot(s) for partition 801 in FIG. 8B. The mailslot for partition 802 preferably remains the highest number slot of tray 811 throughout FIGS. 8A through 8D. The mailslot(s) for partition 803 moves from the highest number slot(s) of tray 813 in FIGS. 8A through 8C to the highest number slot(s) of tray 817 in FIGS. 8D.

Figure 9A:
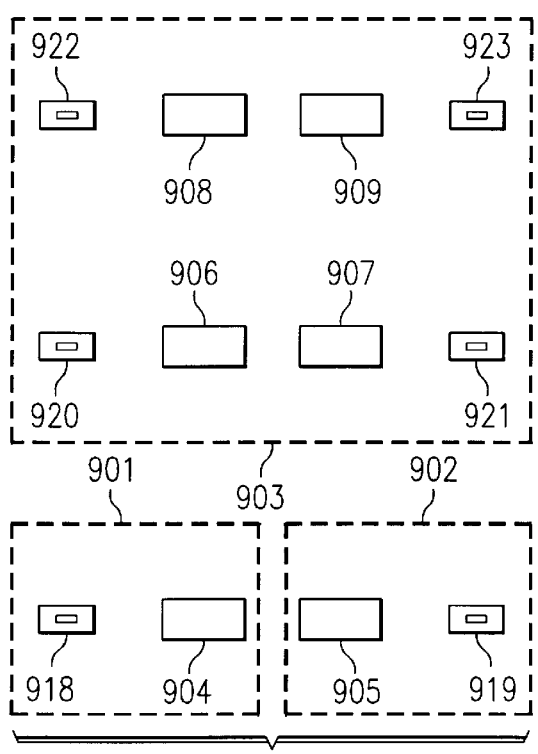

Turning to FIGS. 9A through 9D, compatibility-oriented embodiment 900 provides simplicity and backup software compatibility. Partitions 901, 902, 903, 924 and 925 in a library under a compatibility-oriented embodiment should be equivalent to or emulate existing, or otherwise known data library models. For example, a one drive-nine slot (1/9) library may be emulated using one drive 918 and one tray 904 of slots on one level of a library to provide partition 901 as illustrated in FIG. 9A. In such a 1/9 partition configuration, one slot is not used and is disabled. Preferably, no mailslots are allowed in such a 1/9 partition as no mailslots are present in existing 1/9 libraries. Two 1/9 partitions 901 and 902 may share a level in the illustrated example library shown in FIG. 9A. Preferably, a 2/20 partition, such as partition 924, takes up all of one level and preferably is not split among levels, as shown in FIGS. 9C and 9D, to facilitate emulation of existing library models. 2/20 partition 924 contains two drives 920 and 921 and twenty slots or two trays 906 and 907, from which zero, one, five or ten mailslots may be defined. Four drive and forty slot, 4/40 partition 903 preferably takes up all of two levels and preferably is not split among levels as shown in FIG. 9A. Zero, one, five or ten of the slots may be defined as mailslots for partition 903. Preferably, a 6/60 partition would contain six drives, such as drives 918 through 923, and sixty slots or six trays, such as trays 904 through 909. A 6/60 compatible partition would preferably take up all of three levels of the library and preferably not be split among levels. Zero, one, five or ten of the sixty slots may be defined as mailslots in a 6/60 emulated library. A 6/140 partition containing six drives 918 through 923 and one hundred forty slots in fourteen trays 904 through 917 taking up all of the seven illustrated levels such a 6/140 partitioning of an entire library may be desirable to apply security to the partition as discussed above. Zero, one, five or ten mailslots may be defined from the slots of the 6/140 library.

In existing tape libraries that do not have drives for each level, partitioning using a compatibility-oriented embodiment may call for trays or slots lacking associated drives to be disabled. Therefore, if a 6/140 data tape library, as illustrated in FIGS. 9A through 9D is partitioned other than as a standard 6/140 configuration (i.e., the library contains one or more 1/9, 2/20, 4/40 or 6/60 partitions) trays 910 through 917 of the top four levels of such an existing 6/140 library may be disabled as shown. This preserves the aforementioned emulation, as existing 1/9, 2/20, 4/40, 6/60 libraries being emulated by the compatibility embodiment do not support slots or trays without drives on a level. In the compatibility embodiment, the library controller inquiry string for each active partition type should be the standard inquiry string for the corresponding existing library type or model.

The actions that may be performed on partitions in the compatibility-oriented embodiment 900 may be limited. In compatibility-oriented embodiment 900, partitions are preferably deleted and created as a whole. For example, to resize a 1/9 partition to be part of a 2/20 partition, the 1/9 partition should be deleted, disabling the elements, and the 2/20 partition then created from disabled contiguous elements preferably on the same level. For a delete partition request, as discussed in relation to FIG. 4 above, the slots and data transfer elements in the partition are disabled; and therefore, do not belong to a secured or unsecured partition. A user may create a partition consistent with the process illustrated in FIG. 3 from valid selected disabled slots and data transfer elements. For illustrated compatibility embodiment 900 a valid selection is comprised of a contiguous set of ten (nine active), twenty, forty, sixty or one hundred forty slots and a corresponding contiguous set of one, two, four or six drives. In this embodiment, if a partition with more than ten slots is selected then the partition preferably fully occupies each associated layer in the library to facilitate emulation of existing library models. Ten, twenty, forty or sixty slot partitions should also contain the tape drive associated with each set of ten slots sets of trays. A one hundred forty slot partition of an existing 6/140 library should contain the six drives in the lower three layers of the library. A partition may be configured as allowed by the library to have zero, one, five or ten import/export elements. Preferably, the mailslots will be at the front of the last tray in the partition, the highest numbered slots in the partition, and will be reassigned as appropriate if the partition is resized.

In FIG. 9A, a six drive, fourteen tray library is divided into partitions 901, 902 and 903. First and second partitions 901 have one drive 918 and 919, respectively, and one tray each 904 and 905, respectively. Partition 903 emulates a 4/40 library and has four drives 920 through 923 and four trays 906 through 909 for forty slots.

Figure 9B:
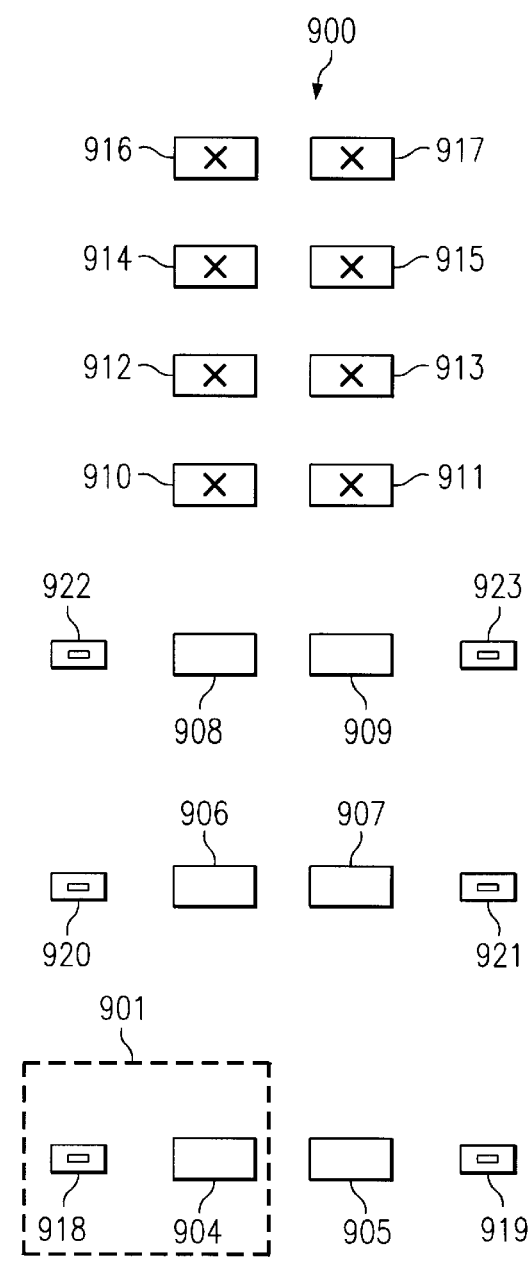

Partitions 902 and 903 are deleted between FIGS. 9A and 9B. Therefore, trays 905 through 909 and drives 919 through 923 are shown as unassigned in FIG. 9B.

2/20 emulated library 924 is created between FIG. 9B and 9C. Contiguous trays 906 and 907 and drives 920 and 921 on the same level are used to create 2/20 partition 924. Similarly, 2/20 library emulation partition 925 of FIG. 9D is created from co-level, contiguous, unassigned trays 908 and 909 and the same level drives 922 and 923. Tray 905 and drive 919 remain unassigned in FIG. 9D.

To provide security in a fibre channel environment, the user may also configure which hosts have access to the resources such as tape drives, library controller and media in each partition. This may be carried out via a web browser interface or via a network management protocol interface. The user may select an active partition and configure the partition to either be unsecured, allowing all hosts access, or restrict access to a list of host WWNs. When a partition is created using the present system and method, by default its security level is set to unsecured. Similarly, the default partitioning of the entire library as partition 0 applies a default security setting of unsecured to partition 0. To prevent all hosts from accessing a partition, the partition may be configured with an empty list of WWNs. Also, access by all hosts to disabled resources not in an active partition is preferably restricted.

If a user modifies a partition's device resources via the library web browser management interface (e.g., adds a device or removes a device), the library management firmware preferably updates the security information on all of the FC-to-SCSI bridges that attach to that partition's device resources, and any native FC drives in the library. This is preferably carried out by sending a security configuration request to each of the FC-to-SCSI bridges and FC tape drives, updating the security on all of the devices in that partition. Thereby, the library management firmware should provide up-to-date security configuration information for each of the FC-to-SCSI bridges. Preferably, this security information, for example, the list of device resources and authorized WWNs for every library partition, is held in non-volatile memory storage. Therefore, if a FC-to-SCSI bridge fails and is replaced, it may be reconfigured to have the same security settings as the replaced FC-to-SCSI bridge.

The RMC preferably allows a user to save the entire library's security configuration to a host, via a web browser, and to re-load the entire library's security configuration via the web browser. If the user wishes to set the library back to default settings or if a replacement FC tape drive that already contains security information from another library is detected, the library management firmware may reset security information by issuing a security configuration request.

Partition security should be persistent between power-cycles and should not require a power cycle to alter partition security. The RMC preferably detects a firmware update to any component in the library. In the event of a firmware update being detected, the RMC preferably reconfigures the security settings of the component. If the library controller detects that a FC tape drive in the library has a firmware update, or the drive is replaced and the tape drive no longer supports partitioning, then the RMC preferably configures the partitioning back to its default state. If the RMC firmware is updated then the RMC should set the security configuration of all components in the library back to the default unsecured state.

If the library management interface allows the user to manually change the SCSI-ID of devices that are associated to FC-to-SCSI bridges, then this operation is preferably integrated with the security system such that any SCSI-ID change via management interface also triggers a security configuration request for the affected library partition to the FC-to-SCSI bridge that is associated to the changed tape drive.

What is claimed is:

1. A storage area network associated data library partitioning system comprising:
   a plurality of storage element slots adapted to store data storage media, at least one set of at least one of said slots is assigned to one partition of a plurality of partitions;
   a plurality of data transfer elements that are adapted to receive said media and transfer data to and from said media, each of at least one set of at least one of said data transfer elements is assigned to one of said partitions; and
   a library controller that assigns a different logical element designation to a virtual controller for each of said partitions, said virtual controllers directing movement of said media to and from one of said set of slots assigned to a same of said partitions.

2. The system of claim 1 wherein said virtual controllers direct movement of said media to and from one of said sets of data transfer elements, said one of said set of slots and said one of said sets of data transfer elements assigned to a same of said partitions.

3. The system of claim 2 wherein a list of unique host device identifiers is maintained on a bridge disposed between said controller and said storage area network.

4. The system of claim 3 wherein said bridge is a fiber channel to small computer systems interface bridge.

5. The system of claim 1 wherein at least one of said partitions is secured and access to a particular one of said secured partitions is restricted to users of said storage area network having a unique host device identifier that is listed in a list of unique host device identifiers for access to said particular partition.

6. The system of claim 5 wherein a blank listing of unique host device identifiers for a secured partition results in last said secured partition being secured from access by any users.

7. The system of claim 5 wherein said list of unique host device identifiers is maintained by at least one of said data transfer elements.

8. The system of claim 5 wherein said unique host device identifiers are world wide names.

9. The system of claim 5 wherein said unique host device identifiers are iSCSI names.

10. The system of claim 1 wherein at least one of said partitions is unsecured allowing access to said unsecured partitions by any user of said storage area network.

11. The system of claim 1 wherein at least one of said elements is disabled and said at least one disabled element may not be accessed by any users.

12. The system of claim 1 wherein at least one of said slots in at least one of said partitions is defined as an import/export slot.

13. The system of claim 1 wherein said logical element designations are small computer systems interface logical unit numbers.

14. The system of claim 13 wherein said virtual controller logical unit numbers are arranged under a small computer systems interface identification of said controller.

15. The system of claim 1 further comprising a management interface that accepts user input partitioning said library and assigns said logical element designation to each of said library partitions.

16. The system of claim 15 wherein said management interface is out-of-band.

17. The system of claim 1 wherein a new partition is comprised of user-indicated data transfer elements and slots for said new partition.

18. The system of claim 17 wherein said new partition is comprised of a set of contiguous slots and contiguous transfer elements not assigned to another partition.

19. The system of claim 17 wherein said new partition is secured by a list of user-supplied unique host device identifiers to be allowed access to said new partition.

20. The system of claim 17 wherein said new partition is unsecured by default.

21. The system of claim 1 wherein said partitions emulate existing models of data libraries and said library controller presents said partitions as said emulated data libraries to users of said storage area network.

22. The system of claim 1 wherein said storage element slots are disposed on levels and said data transfer elements are disposed on said levels and at least one of said partitions is comprised of at least one storage element slot and at least one data transfer element on a same level.

23. A method for partitioning a storage area network associated data library comprising the steps of:
  assigning a different logical element designation to each of a plurality of library partitions;
  establishing said partitions in said data library, each of said partitions comprising at least one storage element slot and at least one data transfer element, each of said slots adapted to store media, and each of said data transfer elements adapted to receive said media and transfer data to and from said media; and
  controlling movement of said media to and from said slots assigned to a same partition.

24. The method of claim 23 further comprising the step of:
  controlling movement of said media to and from said data transfer elements and to and from said slots assigned to a same partition.

25. The method of claim 23 further comprising the step of:
  accepting out-of-band user input partitioning said data library.

26. The method of claim 23 further comprising the step of:
  securing selected ones of said partitions by assigning a list of unique host device identifiers which may access each of said partitions.

27. The method of claim 26 further comprising the step of:
  maintaining said list of unique host device identifiers in at least one bridge disposed between said storage area network and said data library.

28. The method of claim 26 further comprising the step of:
  maintaining said list of unique host device identifiers in at least one of said data transfer elements.

29. The method of claim 23 further comprising the steps of:
  disabling at least one of said elements; and
  preventing access to said disabled element by any user.

30. The method of claim 23 further comprising the step of:
  defining one of said slots as an import/export slot.

31. The method of claim 23 further comprising the step of:
  creating a new partition, said creating step comprising the steps of:
    indicating a set of contiguous data transfer elements not assigned to another partition and a set of contiguous slots not assigned to another partition for said new partition; and
    assigning a lowest available partition number, said indicated slots and said indicated data transfer elements to said new partition.

32. The method of claim 31 further comprising the step of:
  securing selected ones of said new partitions by allowing access by users of said storage area network to each of said partitions according to a list of unique host device identifiers associated with each of said partitions.

33. The method of claim 31 further comprising the step of:
  securing selected ones of said partitions by allowing no users to access a partition having a blank list of unique host device identifiers.

34. The method of claim 23 further comprising the step of:
  deleting an identified partition, said deleting step comprising the steps of:
    disabling all data transfer elements and slots in said identified partition; and
    unassigning all data transfer elements and slots in said identified partition.

35. The method of claim 23 further comprising the step of:
  enlarging an identified partition, said enlarging step comprising the steps of:
    indicating disabled data transfer elements and disabled slots to be added to said identified partition, wherein said indicated data transfer elements and slots are contiguous with existing data transfer elements and slots of said identified partition; and
    enabling said indicated data transfer elements and slots as a part of said identified partition enlarging said identified partition.

36. The method of claim 23 further comprising the step of:
  reducing an identified partition, said reducing step comprising the steps of:
    indicating contiguous data transfer elements and contiguous slots to be removed from said identified partition, wherein data transfer elements and slots to remain in said identified partition are contiguous; and
    disabling said indicated data transfer elements and slots to remove said indicated data transfer elements and slots from said identified partition.

37. The method of claim 23 further comprising the step of:
  altering a security configuration of an identified partition by prompting a requesting user to enter a list of unique host device identifiers allowed to access said identified partition.

38. The method of claim 23 further comprising the steps of:
  emulating existing data libraries models; and
  presenting said partitions as said emulated data library models to users of said storage area network.

39. The method of claim 23 wherein said logical element designations are small computer systems interface logical unit numbers.

40. A partitioned storage area network with an associated data library, said network comprising:
- a data storage array that is divided into partitions, each of said partitions assigned a logical unit number;
- data-mover interconnectivity that extends between said data storage array and said associated data library, via at least one bridge;
- a library management interface that accepts user input partitioning said library and assigns a logical unit number corresponding to logical unit numbers of said array partitions to library partitions, each of said library partitions are comprised of:
  - a set of at least one storage element slot, each slot comprised of a plurality of storage element slots, said slots are adapted to store data storage media; and
  - a set of at least one data transfer element, said data transfer elements are adapted to receive said media and transfer data to and from said media;
  - a library controller that directs movement of said media to and from said set of slots assigned to a same partition; and
  - at least one data mover for direct communication from said array to said library.

41. The network of claim 40 wherein said library controller directs movement of said media to and from said set of data transfer elements, said set of slots and said set of data transfer elements assigned to a same partition.

42. The network of claim 40 wherein said partitions are secured by assigning a list of unique host device identifiers which may access said partition.

43. The network of claim 42 wherein said list of unique host device identifiers is maintained on said at least one bridge.

44. The network of claim 42 wherein said at least one bridge is a fiber channel to small computer networks interface bridge.

45. The network of claim 42 wherein said list of unique host device identifiers is maintained by at least one of said data transfer elements.

46. The network of claim 42 wherein said unique host device identifiers are world wide names.

47. The network of claim 42 wherein said unique host device identifiers are iSCSI names.

48. The network of claim 40 wherein at least one of said elements is disabled and said disabled element may not be accessed by any users.

49. The network of claim 40 wherein at least one of said slots in at least one of said partitions is defined as an import/export slot.

50. The network of claim 40 wherein at least one of said data movers is disabled and said disabled data mover may not be accessed by any users.

51. The network of claim 40 wherein said partitions emulate existing models of data libraries and said library controller presents said partitions as said emulated data libraries to users of said storage area network.

52. The network of claim 40 wherein said management interface is out-of-band.

* * * * *